(12) United States Patent
Wong et al.

(10) Patent No.: US 7,965,174 B2
(45) Date of Patent: Jun. 21, 2011

(54) INTEGRATED BUILDING DEVICE MONITORING NETWORK

(75) Inventors: Wai-Man Wong, Cupertino, CA (US); Martin Benjamin Yudowitz, San Francisco, CA (US); Mark Joshua Golan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 317 days.

(21) Appl. No.: 12/039,507

(22) Filed: Feb. 28, 2008

(65) Prior Publication Data

US 2009/0219145 A1    Sep. 3, 2009

(51) Int. Cl.
G08B 9/00    (2006.01)
(52) U.S. Cl. ............... 340/286.02; 340/3.1; 340/310.11; 340/539.13; 340/825.49; 370/463; 700/276
(58) Field of Classification Search ............. 340/286.01–286.02, 310.11, 3.1, 340/310.08, 825.49, 825.07, 506, 539.13; 312/223.6; 709/217–224; 700/276, 3; 707/104.1, 707/10; 455/420; 702/188, 62; 705/51; 370/463; 160/135; 52/239
See application file for complete search history.

(56) References Cited

U.S. PATENT DOCUMENTS

| | | | |
|---|---|---|---|
| 4,918,615 A | 4/1990 | Suzuki et al. | |
| 5,397,929 A | 3/1995 | Hogarth et al. | |
| 5,706,455 A | 1/1998 | Benton et al. | |
| 6,067,477 A | 5/2000 | Wewalaarachchi et al. | |
| 6,088,659 A | 7/2000 | Kelley et al. | |
| 6,104,963 A | 8/2000 | Cebasek et al. | |
| 6,141,595 A | 10/2000 | Gloudeman et al. | |
| 6,157,943 A | 12/2000 | Meyer | |
| 6,178,362 B1 | 1/2001 | Woolard et al. | |
| 6,211,796 B1* | 4/2001 | Toms et al. | 340/825.49 |
| 6,240,326 B1 | 5/2001 | Gloudeman et al. | |
| 6,598,056 B1 | 7/2003 | Hull et al. | |
| 6,642,852 B2 | 11/2003 | Dresti et al. | |
| 6,828,695 B1 | 12/2004 | Hansen | |
| 6,870,463 B2 | 3/2005 | Dresti et al. | |
| 6,922,558 B2 | 7/2005 | Delp et al. | |
| 6,929,487 B1 | 8/2005 | Raghavendra et al. | |
| 7,039,532 B2 | 5/2006 | Hunter | |
| 7,049,932 B2 | 5/2006 | French et al. | |
| 7,110,919 B2 | 9/2006 | Brindac et al. | |
| 7,143,149 B2 | 11/2006 | Oberg et al. | |
| 7,183,899 B2 | 2/2007 | Behnke | |
| 7,323,991 B1* | 1/2008 | Eckert et al. | 340/572.1 |
| 7,483,797 B2* | 1/2009 | Nambu | 702/60 |
| 2003/0176952 A1* | 9/2003 | Collins et al. | 700/286 |
| 2005/0083966 A1* | 4/2005 | Zodnik | 370/463 |
| 2005/0246248 A1* | 11/2005 | Vesuna | 705/28 |
| 2005/0267605 A1* | 12/2005 | Lee et al. | 700/19 |
| 2006/0049936 A1* | 3/2006 | Collins et al. | 340/539.11 |
| 2006/0120008 A1 | 6/2006 | Kreiner | |

* cited by examiner

*Primary Examiner* — Brent Swarthout
(74) *Attorney, Agent, or Firm* — Schwegman, Lundberg & Woessner, P.A.

(57) ABSTRACT

An electrical device for installation within a building is described. Accordingly, the device may comprise a mounting arrangement configured to mount the device within the building. A location module is provided to monitor a location of the device within the building and a power monitor is provided to monitor power consumption of an electrical appliance connectable to the device. The device further includes a communication module configured to interface the electrical device to a communications network and to communicate the location and the power consumption via the communications network. In an example embodiment, the communications network is connectable to a system controller that is operable to communicate with a plurality of the electrical devices to control operation of the electrical devices. The device and the system controller may form part of a building management system.

23 Claims, 10 Drawing Sheets

INTEGRATED BUILDING DEVICE MONITORING NETWORK

FIELD

This application relates to networked electrical devices, for example networked electrical devices mountable within a building.

BACKGROUND

Buildings include power reticulation systems that provide power to many electrical appliances or electrical loads that consume electrical power. Such appliances may be fixed or movable devices. Examples of fixed appliances include lights, heating apparatus, electrical power outlets or the like that are typically permanently mounted within the building. Examples of movable appliances include LCD projectors, computers, or the like.

BRIEF DESCRIPTION OF DRAWINGS

Example embodiments are illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth to provide a thorough understanding of example embodiments. It will be evident, however, to one skilled in the art that other embodiments may be practiced without these specific details.

OVERVIEW

An electrical device, system, and method to provide location information of electrical devices in a building are described. The electrical device may comprise a mounting arrangement, a device communication module, a location module, and a network communication module. The mounting arrangement may be configured to mount the device operatively within a building and the device communication may be configured to communicate with at least one other electrical device located in use within the building. The location module may be configured to provide a location of the at least one other device within the building and the network communication module may interface the electrical device to a communications network thereby to communicate the location via the communications network.

Example Embodiments

Figure 1A:
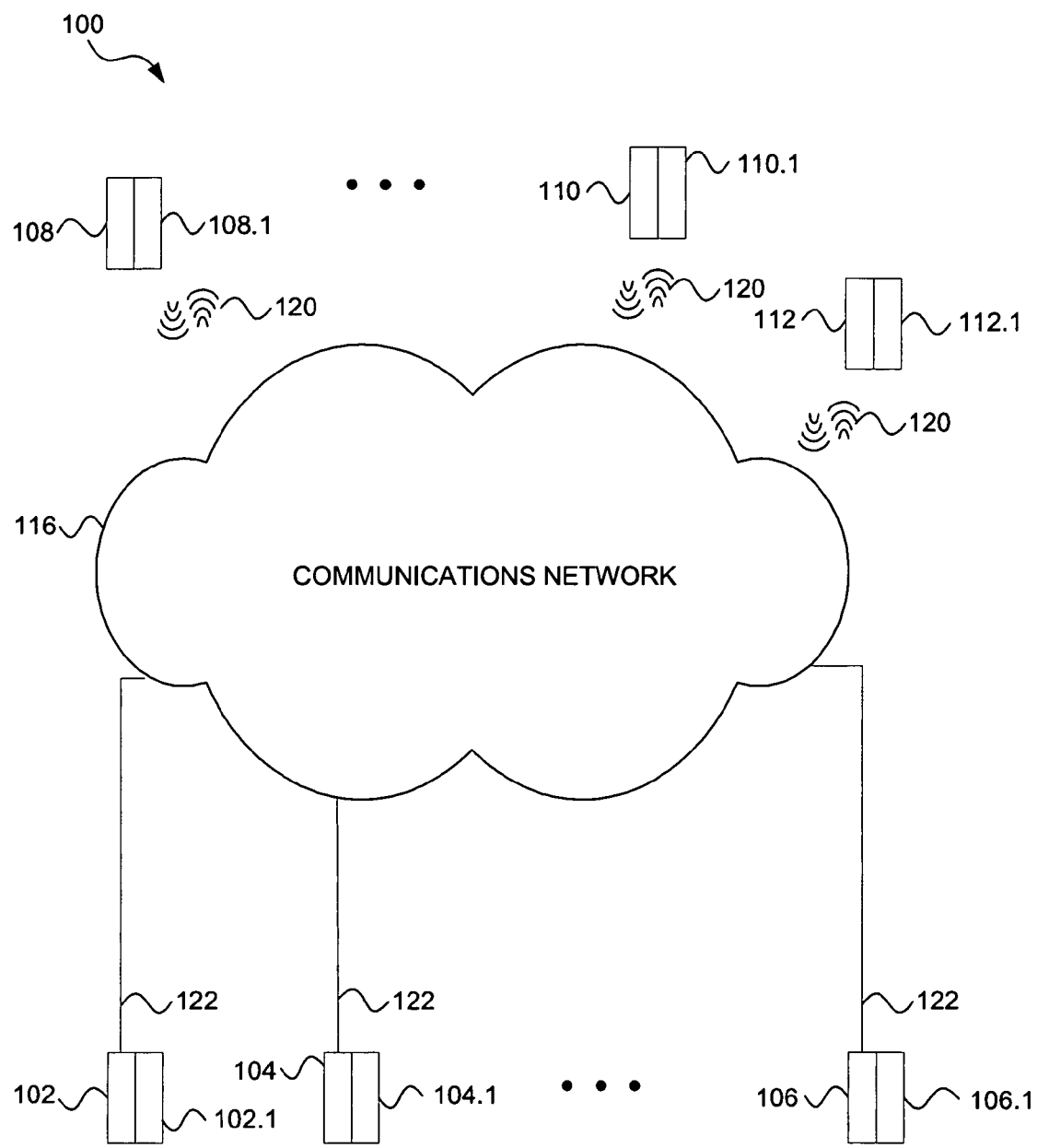
FIG. 1A shows a schematic block diagram of a system, in accordance with an example embodiment, in which a plurality electrical devices communicate via a network in a building.

FIG. 1A shows a schematic block diagram of a system 100, in accordance with an example embodiment, in which a plurality of electrical devices communicates via a communications network in a building. As described by way of example in more detail below, each electrical device may be associated with an electrical appliance (or electrical load) that it may, at least partially, control. In an example embodiment each electrical device is configured to provide a relative location of one or more other electrical devices located within the building (e.g., electrical devices located within a room of the building).

The system 100 is shown by way of example to include electrical devices 102-106 configured to communicate over hardwired connections 122, and electrical devices 108-112 configured to communicate over wireless connections 120. Each device 102-112 is shown to be coupled to an associated electrical appliance 102.1-112.1. Examples of the electrical appliances 102.1-112.1 include lights, power outlets, heating apparatus, computers, DVD players, projectors, and any other electrical appliance that may be fixedly or movable located within the building.

Figure 1B:
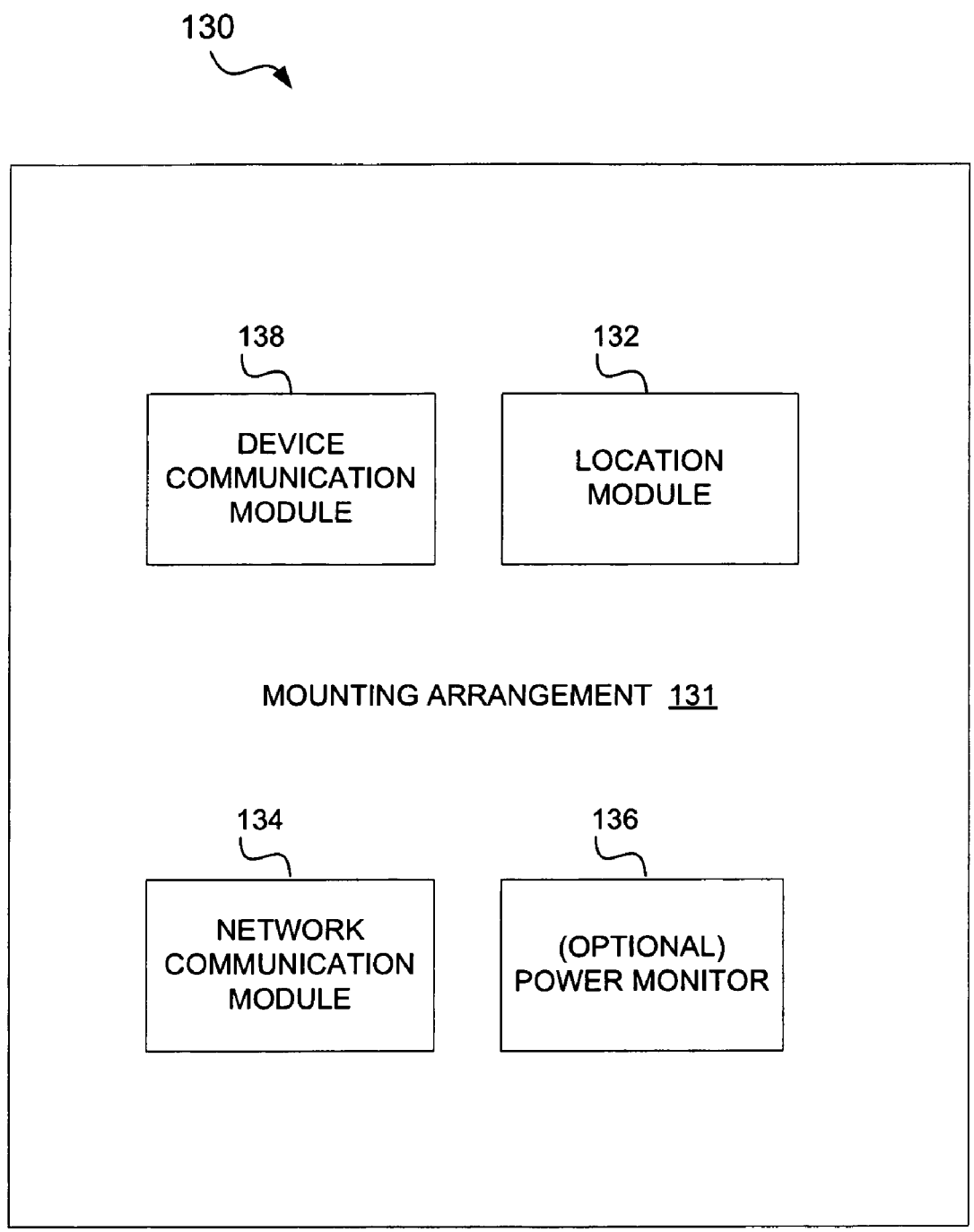
FIG. 1B shows an electrical device, in accordance with an example embodiment, configured to provide a location of the at least one other device within a building.

An example electrical device 130, which may be similar to one or more of the electrical devices 102-112, is shown by way of example in FIG. 1B. The electrical device 130 includes a location module 132 to identify a location of the electrical device 130 or one or more other electrical devices within the building (e.g., using a mounting arrangement 131). A network communication module 134 is provided to communicate the location via a communications network 116, for example, to a monitoring console. In an example embodiment, a power monitor 136 is provided to monitor power consumed by an associated electrical appliance. A device communication module 138 is provided to communicate with one or more other electrical devices to determine the location of other electrical devices. The device communication module 138 may be a low-power short-range transceiver. In use, a plurality of electrical devices 130, with their associated device communication modules 138, may be provided and interconnected to form a mesh or a cluster network.

In an example embodiment, the electrical devices 102-112 form part of a building management system. Thus, the electrical devices 102-112 may be provided (e.g., fixedly installed during building construction) at various locations (e.g., various rooms) within the building and, inter alia, identify or monitor location of other electrical devices and power consumption at these various locations.

Each electrical device 102-112 may have associated device information. The device information may, for example, include a physical location of the electrical device 102-112 with respect to the building, asset identification data (e.g., a serialized numbering system used for tracking assets), a device type (e.g., if the device is a power outlet, light ballast, or the like), an electrical appliance type associated with the electrical device (e.g., a television, projector, computer, or the like), and/or any other electrical device related information. Examples of electrical devices include power outlets (e.g., outlet sockets), light ballasts, heating ventilation air conditioning (HVAC) devices such as variable air volume (VAV) electrical devices and fan coil units (FCU), thermostats, security system components, and any other electrical appliances that may be installed in the building. It will thus be appreciated that a plurality of electrical devices 102-112 may be provided in a plurality of rooms in the building (or throughout a plurality of associated buildings).

The hardwired electrical devices 108-112 may be deployed in locations where wired communications are more cost effective, for example, where a wired network (such as an Ethernet) is already provided (or will be provided, e.g., during construction). In an example embodiment, a "Power-over Ethernet" network may be utilized to effect communication and provide power to one or more electrical devices. In addition or instead, the hardwired electrical devices 108-112 may be configured to communicate via power lines of a power reticulation network to which the electrical devices 108-112 are connected.

In an example embodiment, the communications network 116 is an Internet Protocol (IP) network that includes network devices such as wired routers, wireless routers, switches and other network devices that communicate and route data between the electrical devices 108 through 112, and a system controller.

In some example embodiments, the communications network 116 may be shared by other electronic devices. For example, the communications network 116 may be part of one or more wireless computer networks, a cellular telephone network, or any other network capable of communicating data between networked devices. In example embodiments, the communications network 116 includes, but is not limited to, one or more ZigBee Alliance networks, 802.11x networks (e.g., 802.11b, 802.11c or the like), 802.15.4 networks, 802.51 networks, 802.16 networks, 802.20 networks, and/or Bluetooth networks.

Figure 1C:
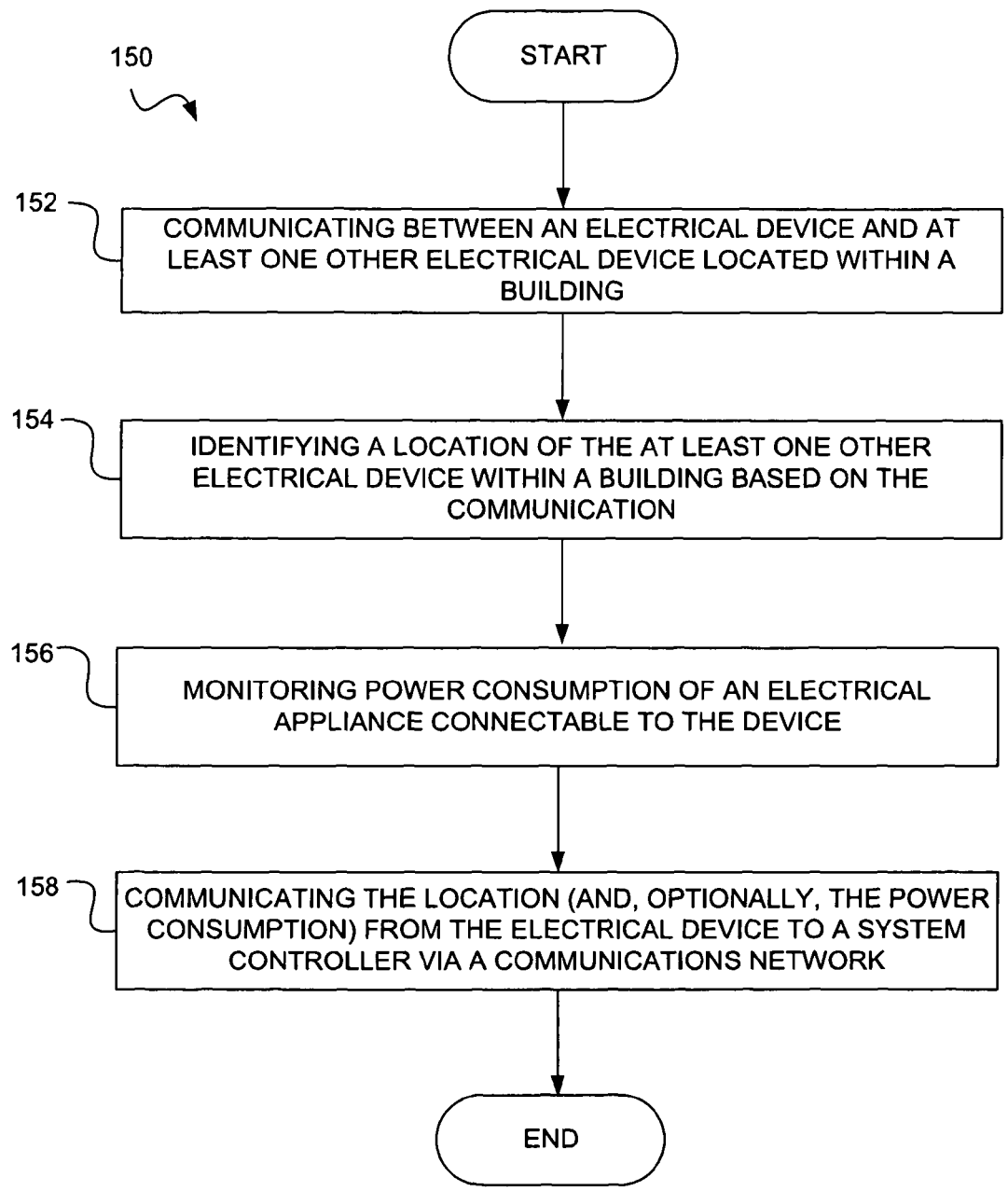
FIG. 1C shows a flow diagram of a method, in accordance with an example embodiment, for monitoring a plurality electrical devices in a building.

FIG. 1C shows a flow diagram of a method 150, in accordance with an example embodiment, for monitoring a plurality of electrical devices mounted in a building. The method 150 may be deployed in the system 100 and may be performed by the electrical devices 102-112 (see FIG. 1A) or the electrical 130 (see FIG. 1B).

As shown at block 152, the method 150 includes communicating between an electrical device (e.g., the electrical devices 102) and at least one other electrical (e.g., the electrical devices 108) device located within a building. In an example embodiment, the electrical device (e.g., the electrical devices 102) is fixedly mounted within the building (e.g., installed during constructions). Thereafter, a location of the at least one other electrical device (e.g., the electrical devices 108) within a building is identified based on the communication (see block 154). Optionally, power consumption of an electrical appliance associated with the electrical device may be monitored (see block 156). The location and power consumption from the electrical device (e.g., the electrical devices 102) is then communicated to a system controller via a communications network (see block 158).

Figure 1D:
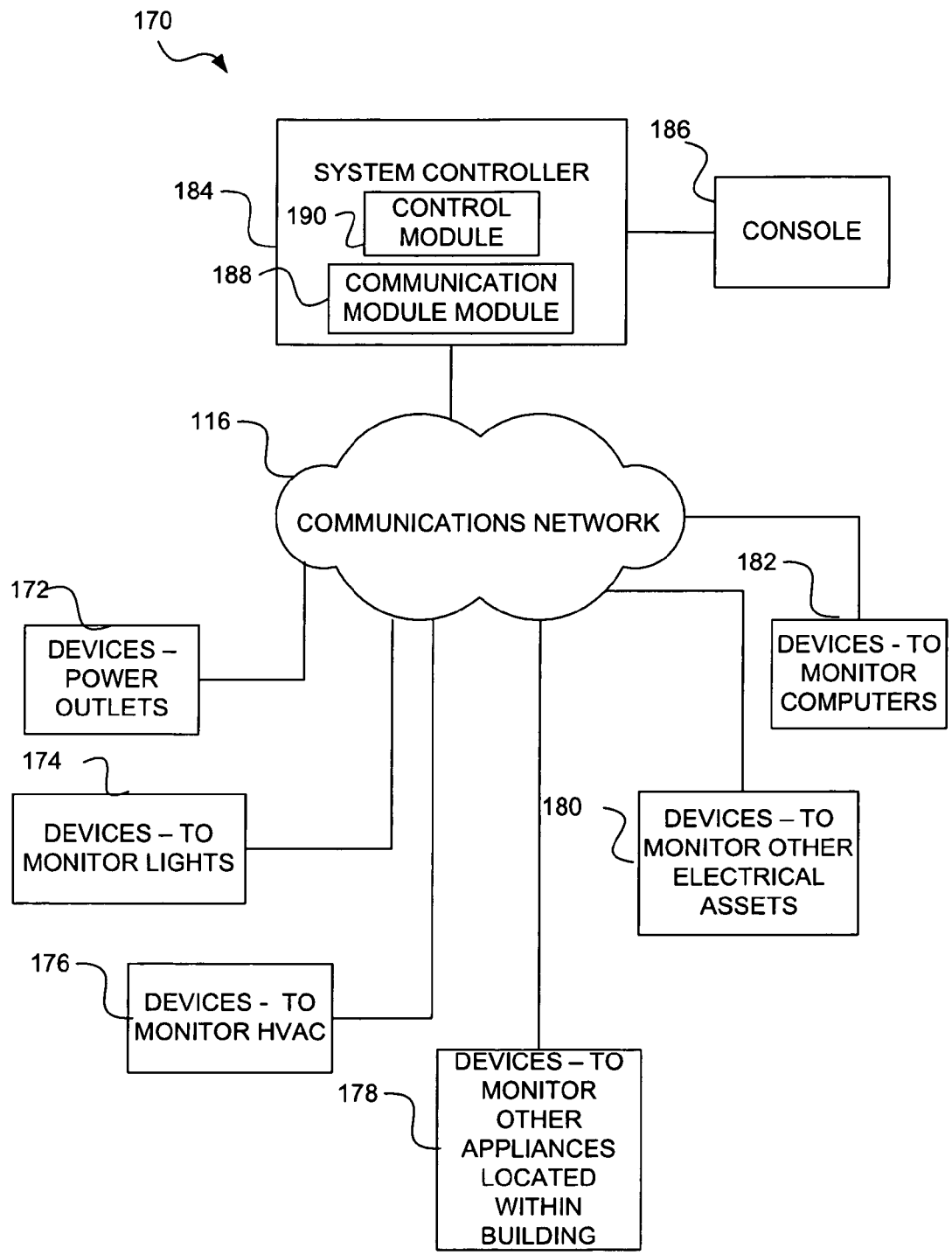
FIG. 1D shows a schematic block diagram of a system, in accordance with an example embodiment, in which a plurality electrical devices are managed by a system controller including a console.

In an example embodiment, the system controller may then communicate control instructions to one or more other electrical devices (e.g., the electrical devices 102-112) to control operation of an electrical appliance connected to an associated electrical device. In an example embodiment, the location and the power consumption is communicated via a power reticulation network to which the electrical device (e.g., the electrical devices 102) is connected. Referring to FIG. 1D, reference numeral 170 shows a schematic block diagram of a system, in accordance with an example embodiment, in which a plurality electrical devices 172-182 is managed by a system controller 184 including a console 186. The electrical devices 172-182 and system controller 184 are operatively coupled via a communications network 116. Each of the electrical devices 172-182 are shown to be connectable to an associated electrical appliance. For example, the electrical device 174 may be connected to a light ballast to monitor power consumption of circuitry associated with a light (e.g., a light ballast), the electrical device 176 may be connected to an HVAC, the electrical device 178 may be configured to monitor one or more other devices (e.g., projectors in conference rooms) in the building, the electrical device 180 may configured to monitor electrical assets (e.g., laptop computers) in the building, and the electrical device 182 may be configured to monitor desktop computers. It should be noted that any other electrical loads or appliances may be monitored. In an example embodiment, the electrical device may include a mounting arrangement configured to mount the device operatively within a building. For example, when the electrical device is a power outlet (see electrical device 172) a mounting plate may be provided to mount the power outlet to the building. Various components of the electrical device 172-182 (see for example FIG. 1B) may then be integrated within the power outlet.

In an example embodiment, the system controller 184 includes a network communication module 188 to interface the system controller 184 to the communications network 116. A control module 190 is provided and is configured to receive a location and power consumption data from one or more of the electrical devices 172-182. Based thereon, control instructions may be communicated to the electrical devices 172-182 to control operation of electrical appliances connectable to the electrical devices 172-182. The user console 186 may allow a user such as a building administrator to manage a building including the system 170. The console 186 may be provided with a display to display the power consumption and the location of the electrical devices 172-182. Further, the console 186 may include a user input module (e.g., including a keyboard) to receive user input from a user. A processing module may be provided to process the user input and to generate control signals to communicate to one or more of the electrical devices 172-182.

In an example embodiment, the electrical devices 172-182 may include memory to store information about the device and/or an associated electrical appliance. For example, a physical location of the device may be stored in the memory using physical coordinate data that identifies where the device is located within the building. Examples of physical coordinate data include x, y, and z coordinates provided with reference to the building, building/room number pairs, polar coordinates with reference to the building, or any other identification arrangement that identifies an electrical device within the building. As the physical location of the electrical device is known, this may be used to determine the relative location of another electrical device in a given space such as a room in a building.

In an example embodiment, each device 172-182 is integral within a building fixture. Such integration may, for example, include locating each device 172-182 in a housing of an electrical appliance. For example when the electrical appliance includes a mounting frame (e.g., a frame of a power outlet in a building), the device 172-182 may be fixed to the frame, such as by nut- and bolt fasteners, adhesive, welding, or the like. Various electrical components of the electrical 172-182 may be provided on a common circuit board, with the circuit board coupled to the mounting frame.

Figure 2:
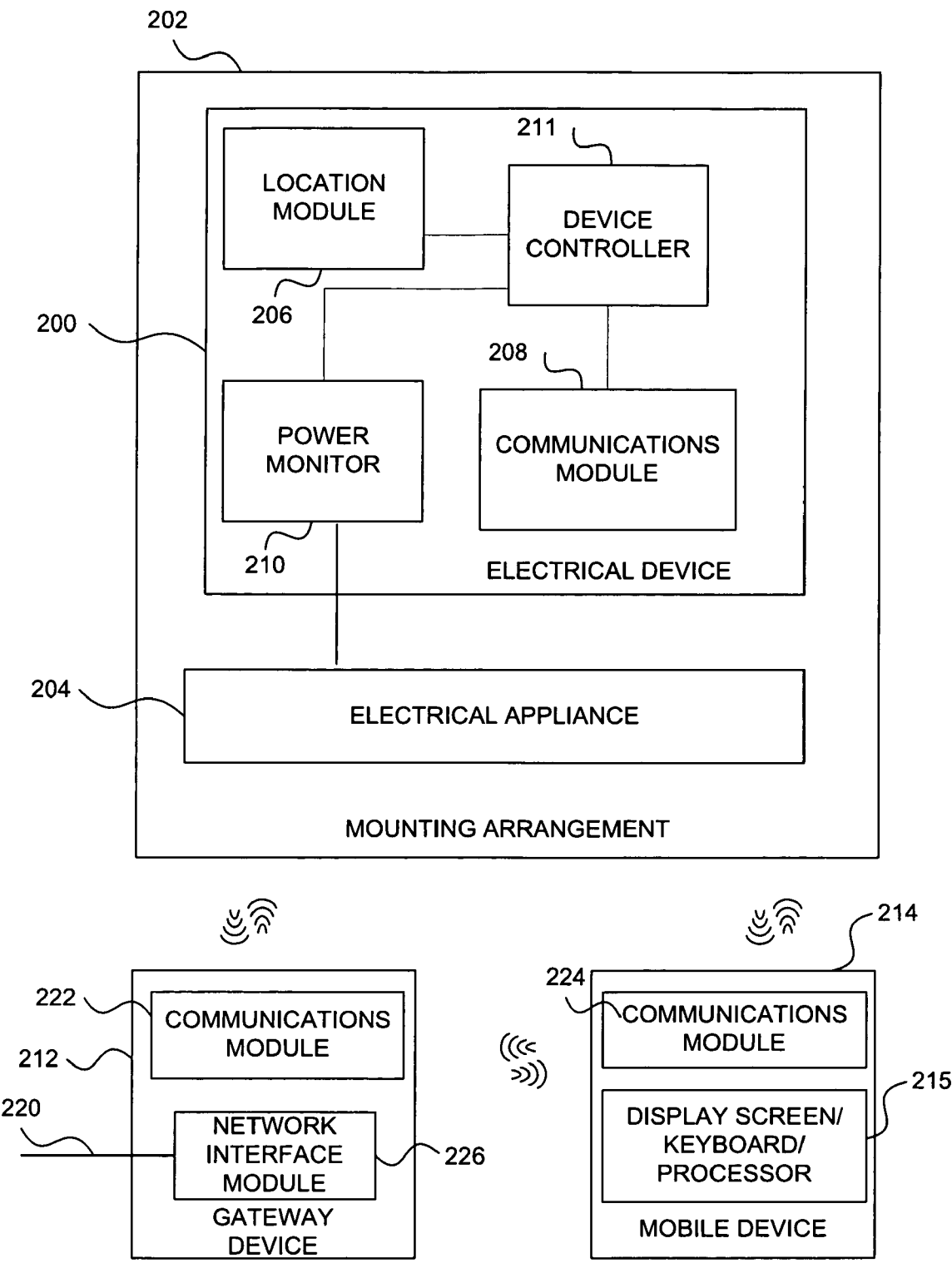
FIG. 2 shows a schematic block diagram of electrical devices, in accordance with example embodiments, that may be deployed in the systems of FIGS. 1A and 1D.

FIG. 2 shows a schematic block diagram of electrical devices 200, 212, and 214, in accordance with example embodiments, that may be deployed in the system 100 (see FIG. 1A). Accordingly, the electrical devices 200, 212, and 214 are configured to communicate via the communications network 116.

The electrical device 200 is shown to form part of an electrical appliance 204 and may thus be integral with a mounting arrangement 202 for mounting the electrical appliance 204 within a building. For example, the mounting arrangement 202 may be part of a lamp or lighting arrangement to permanently mount (e.g., screw or bolt) the electrical appliance 204 within the building. The electrical device 200 may be connected to a lamp ballast of the lamp.

The electrical device 204 is shown to include a location module 206 configured to identify a location of the electrical device 200 within the building and a power monitor 210 configured to monitor power consumption of the electrical appliance 204 connected to the electrical device 200. A communication module 208 is provided and is configured to interface the electrical device 200 to a communications network and thereby communicate the location and the power consumption via the communications network to, for example, a building management system. The communications module 208 may also communicate wirelessly with other electrical devices located within a room in a building.

A device controller 211 is provided to control operation of, inter alia, the location module 206, the communications module 208, and the power monitor 210. In an example embodiment, transmit only functionality as opposed to bidirectional (transceiver) functionality may be provided. In certain example embodiments, the electrical device 200 may monitor more than one electrical device such a group of lights in a room in a building, an electrical appliance (e.g., portable computers or projectors) located within a room in a building, or the like.

Turning to the electrical device 212, this device is shown by way of example to be configured as a gateway node. The electrical device 212 includes a communications module 222 to communicate wirelessly with the communications network 116, and a network interface module 226 to interface the wireless communications network 116 to a wired communications network (e.g., an Ethernet). The electrical device 212 may thus form a gateway node that interfaces a plurality of electrical devices to the wired communications network (see line 220). In the example embodiment shown in FIG. 2, the electrical device 212 is shown to interface the electrical device 200 and the electrical device 214 to the wired network.

The example electrical device 214 is shown to also include a wireless communications module 224 and is configured as a mobile device (or node). In an example embodiment, this mobile device 214 may be self-powered and may function as a test device or location device that allows a user to test and/or locate electrical devices deployed in a building. Accordingly, the electrical device 214 may include a display screen, keyboard, processor, and other electrical circuitry (see block 215) to locate and communicate with other electrical device in the building. For example, this test or location device can be used to direct a building operator to a particular node or device in a building using navigational instructions. The mobile device 214 may use location algorithms to determine a physical location of the electrical devices (e.g., electrical devices 108-112 and electrical devices 172-182). In an example embodiment, the mobile device 214 identifies the location of one or more other electrical devices relative to the mobile device 214. In an example embodiment, a location algorithm may process a received signal strength indication (RSSI), an angle arrival of a received signal, time difference of arrival in the received signal, or the like to obtain at least an indication of the location of an associate electrical device. A location may also be determined by receiving signals from other electrical devices using triangulation.

Figure 3A:
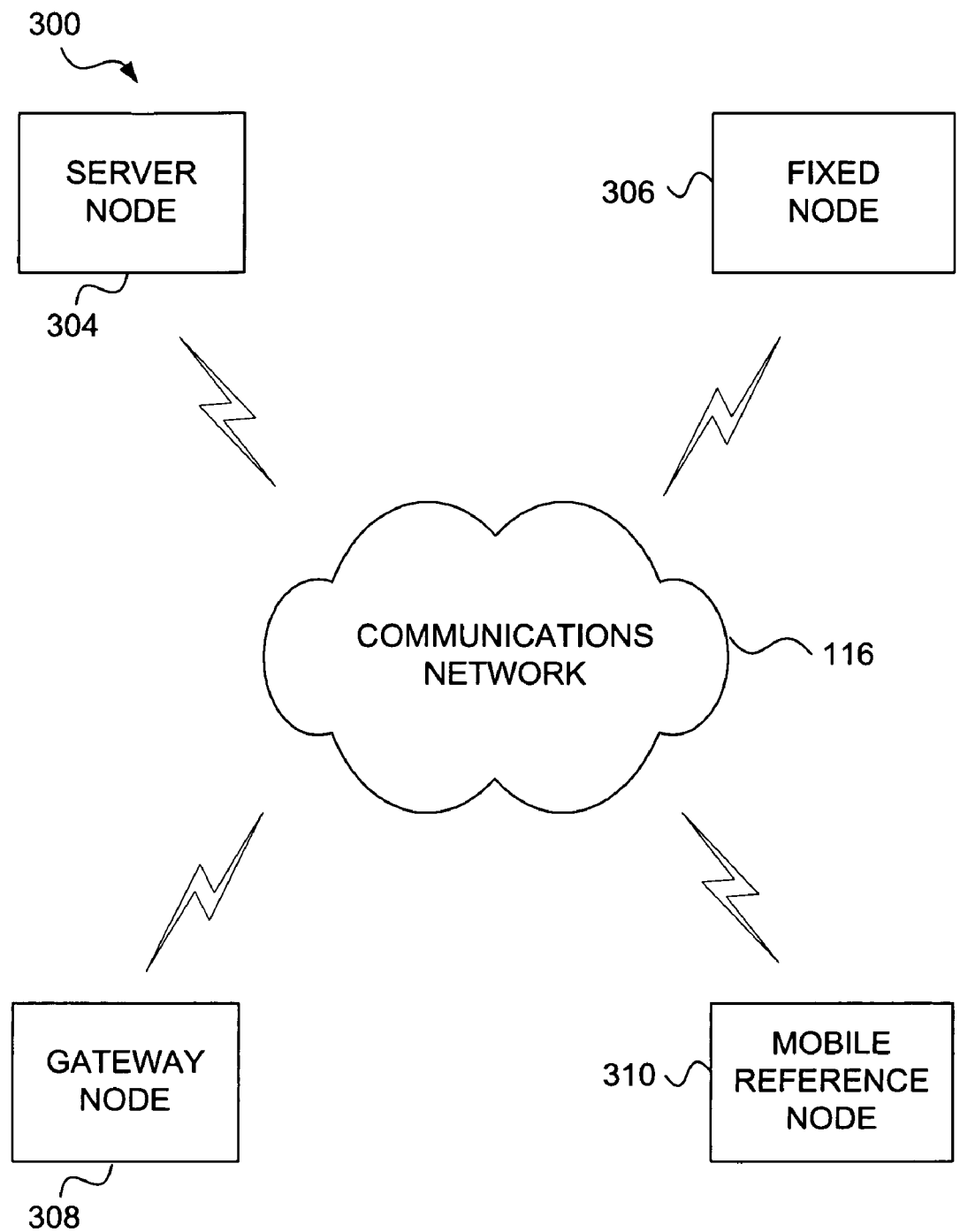
FIG. 3A shows a high-level block diagram in which electrical devices are arranged into nodes.

FIG. 3A shows a high-level block diagram of example network nodes 300 of the system 100 of FIG. 1A. The network nodes 300 are shown by way of example to include a server node 304, a fixed node 306 (e.g., a computer that should remain permanently in the building, such as a panel mount personal computer, a desktop computer, or the like), a gateway node 308, and a mobile node 310. In an example embodiment, one or more of the nodes 304, 306, 308, and 310 may be associated with a plurality of electrical devices (e.g., the electrical devices 102-112 and/or 172-182). Further, location of a particular electrical device in a building may be provided with respect to the node with which it is associated. In an example embodiment, the gateway node 308 may provide access to an IP backbone (e.g., the Internet) to facilitate remote management of electrical devices associated with the node. In a building equipped with a plurality of electrical devices (e.g., the electrical devices 103-112 and/or 172-182), many fixed nodes may be provided. For example, many power outlets and lights in the building may be associated with one or more fixed nodes 306. It should be noted that in other embodiments, a plurality of each different types of nodes may be provided and one or more electrical devices may be associated with each node.

In an example embodiment, the communications network 116 is in communication with municipal energy grid monitors (e.g., a plurality of electrical meters). Each grid monitor may monitor energy provision and communicate data via the communications network 116 to provide to energy consumption information to a console (e.g., see the console 186 shown in FIG. 1D). A building manager may, for example, use this information to identify a power source having a preferred stability level to be used by equipment sensitive to power fluctuations. Accordingly, one or more power outlets connected to the stable energy source may be enabled by the building manager for use by the sensitive equipment. In an example embodiment, the server node 304 may include an application programming interface (API) for use by other devices to, for example, control and monitor electrical devices connected to the communications network 116. For example, the server node 304 may correspond to the system controller 184 of the system 170 (see FIG. 1D) and, accordingly, run the API.

Figure 3B:
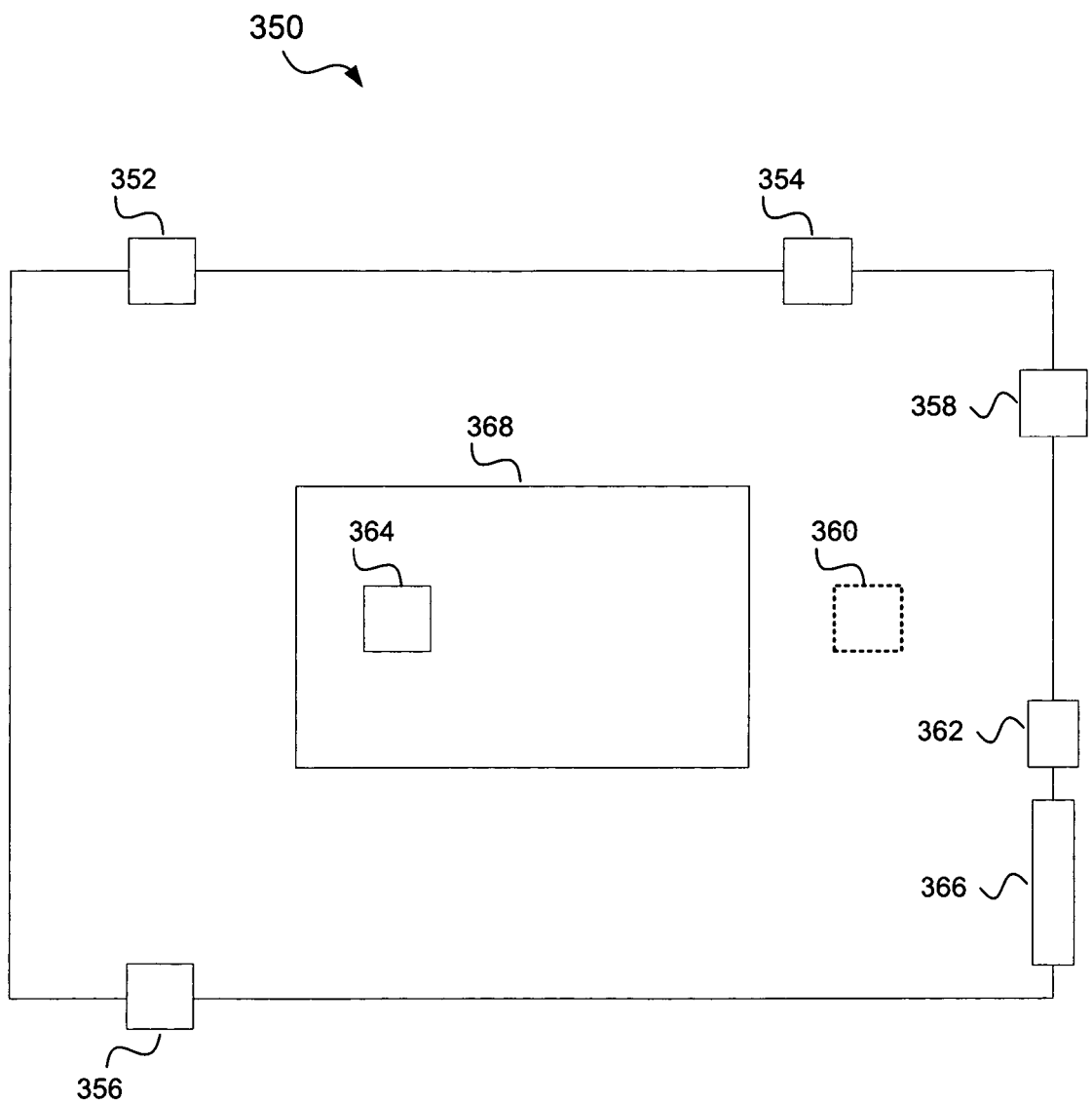
FIG. 3B shows multiple electrical devices fixedly mounted in a room of a building.

FIG. 3B shows multiple electrical devices fixedly mounted in a room 350 of a building. The room 350 may, for example, define a node as described above with reference to FIG. 3A. The room 350 is shown by way of example to include power outlets 352-358 fixedly installed in the room 350 (e.g., during construction). Each of the power outlets 352-358 may include the electrical device 130 (e.g., see FIG. 1B) to determine a location of one or more other electrical devices in the room 350. Further, a ceiling light 360 and a thermostat 362, both including the electrical device 130, are also mounted in the room 350. The thermostat 362 is shown to be mounted adjacent a door 366. The room 350 is also shown to include a projector 364, located on a table 368, connectable to a computer for projecting a computer screen onto a wall of the room 350. In an example embodiment, the projector 364 includes the electronic device 130 shown in FIG. 1B. In use, electronic devices 130 provided in the power outlets 352-358, in the ceiling light 360, and in the thermostat 362 may communicate with the electronic device 130 in the projector 364. Based on these communications, the location of the projector 364 within the building may be determined. It will be appreciated not all electrical appliances in the room 350 require integration of the electronic device 130. For example, in an example embodiment, a single fixed node may be defined (e.g., by the power outlet 356) and the relative location of the projector 364 (and/or any other appliances equipped with the electronic device 130) may then be determined based on communications between the power outlet 356 and the projector 364 (and/or any other appliances equipped with the electronic device 130). As mentioned above triangulation or any other location algorithm may be used to identify a location of another electrical device 130 located in the room. It will also be appreciated that the components of the electronic device 130 may be included in a tag work by a person. Accordingly, a networked building arrangement including a plurality of the electronic devices 130 may be used to monitor the location of persons (e.g., employees).

Figure 4:
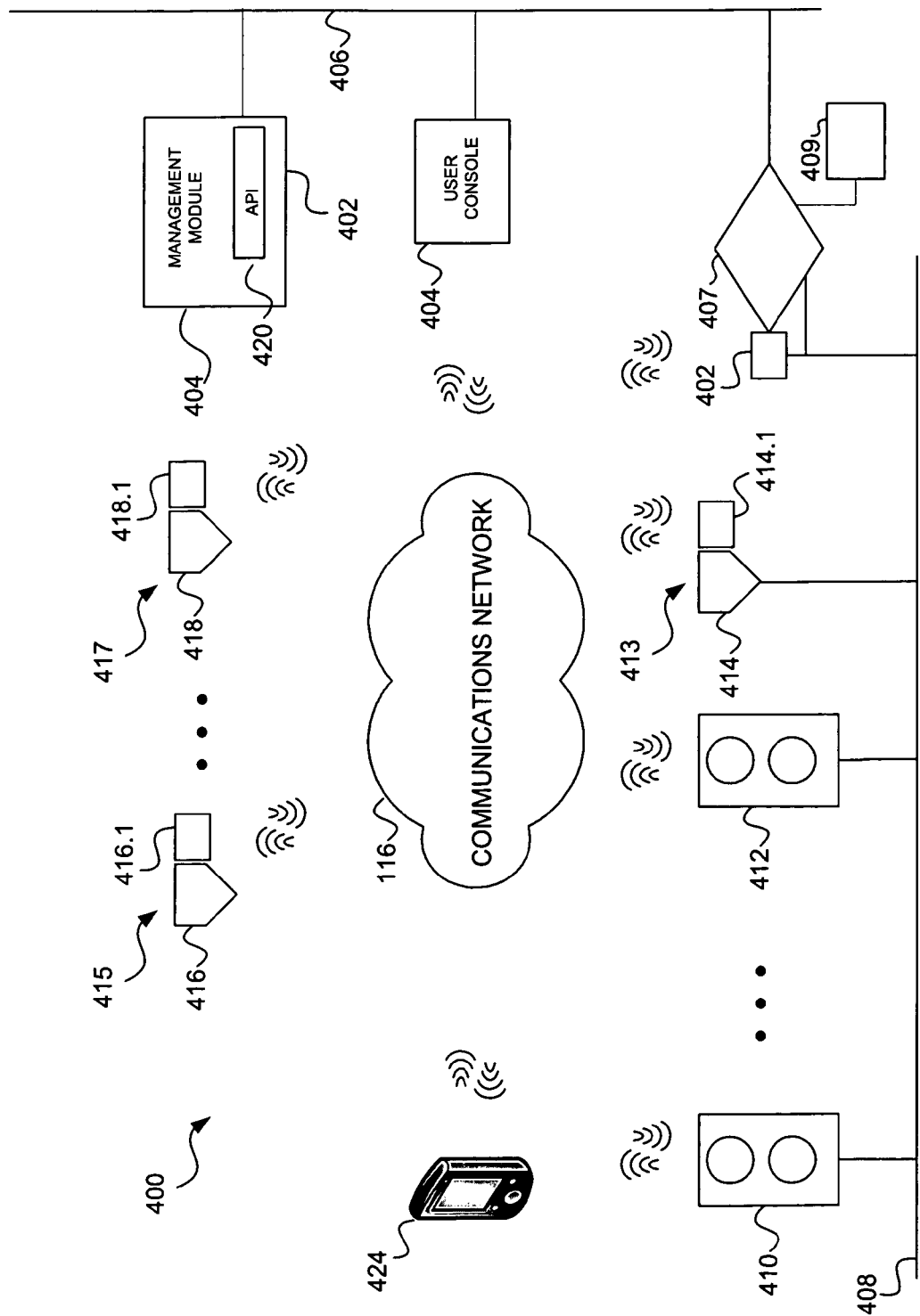
FIG. 4 shows a schematic block diagram of a system, in accordance with an example embodiment, in which multiple electrical devices deployed in a building communicate via both wired and wireless communication links.

FIG. 4 shows a schematic block diagram of a system 400, in accordance with an example embodiment, in which multiple devices deployed in a building communicate via both wired and wireless links. The system 400 is connected to an IP backbone 406 and a power reticulation network 408 of the building in which the system 400 is installed. The power reticulation network 408 is wired to a building power supply.

The system 400 is shown to include a management module 402, a user console 404, and a power-to-data gateway node 407 that are connected to the IP backbone 406. The user console 404 may provide a wireless gateway to various networked devices in the building, as described in more detail below. The power-to-data gateway node 407 may be configured to manage multiplexed data communications over the power reticulation network 408. Accordingly, the power-to-data gateway node 407 may receive information about an electrical device directly connected to the power reticulation network 408, or indirectly connected to the power reticulation via a wireless network 116. In some example embodiments, the power-to-data gateway node 407 communicates information over a wired network connection (e.g., a USB connection) to another device such as a personal computer personal computer 409.

The system 400 is also shown to include power outlets 410-412 installed within the building and thus connected to the power reticulation network 408. Each power outlet 410-412 may include the electrical device 200 (see FIG. 2). The system 400 is also shown to include a lighting arrangement 413 including an electrical device 414 (which may be substantially similar to the electrical device 200) connected to a light ballast 414.1. As described by way of example above with reference to FIG. 2, power consumption and location data may be communicated from the power outlets 410-412 and the lighting arrangement 413 to the management module 402 and/or the user console 404. Accordingly, in an example embodiment, power provided to appliances plugged into the power outlets 410-412 and to the lighting arrangement 413 may be controlled by the management module 402 (e.g., the appliances may be turned on and off). In an example embodiment, one or more of the power outlets 410-412 may form part of a rack for computers in a data center.

The system 400 is also shown, by way of example, to include further lighting arrangements 415 and 417. The lighting arrangements 415, 417 include electrical devices 416, 418 (which may be substantially similar to the electrical device 200) and their associated ballasts 416.1, 418.1. In some example embodiments, one or more of the power outlets 410-412, the lighting arrangements 413, 415, 417, the power-to-data gateway 407, the user console 404, and the management module 402 store at least some device data. For example, the device data may include information on device behavior (e.g., power consumption), a state of operation of the device (e.g., whether a light is on or off), location information about the device, asset-tracking information, or other any other information.

The user console 404 may include application software to allow an administrator to perform an analysis of the status of the power outlets 410-412 and lighting arrangements 413, 415, 417 connected to the communications network 116. For example, application software may monitor and process energy requirements of the power outlets 410-412 and lighting arrangements 413, 415, 417 connected to the network 116. For example, using outputs from the application software, the administrator may identify one or more devices that may be deactivated to save energy. The application software may also identify where an electrical device to be deactivated is located.

In an example embodiment, the system 400 includes an API 420 to facilitate access to the communications network 116 by one or more remote computers. The API 420 may communicate with other enterprise systems to facilitate collection of information from these devices and control operation of the devices. Example components of the API 420 include, but are not limited to, a policy engine interface, an energy management system interface, a fire system interface, a security system interface, or the like. Thus, in an example embodiment, a stand-alone fire system can access any node or device using the API 420. The fire system may also include one or more of the electronic devices 200.

The system 400 is also shown to include a mobile device 424 (which may be substantially similar to the mobile device 214) that is configured to communicate wirelessly with the communications network 116. In an example embodiment, the mobile device 424 is configured to communicate with the power outlets 410-412 and the lighting arrangements 413, 415, 417 and the user console 404 via the communications network 116. The mobile device may include circuitry to identify a physical location of the each of the power outlets 410-412, the lighting arrangements 413, 415, 417 and the user console 404. In an example embodiment, the mobile device 424 is configured to control multiple devices including the power outlets 410-412, the lighting arrangements 413, 415, 417, the user console 404, and the power-to-data gateway 407. The mobile device 424 may also be configured to identify its physical location within the building and provide location information to a user. In an example embodiment, the mobile device 424 includes navigational software to assist a user in navigating through a building. In one example embodiment, the mobile device includes memory to store a building map to facilitate navigation in the building. The mobile device 424 may thus include a display for displaying information.

In an example embodiment, the mobile device 424 includes a processor and associated circuitry and may be programmed to keep track of the operational status of electrical devices that it controls. Thus, in an example embodiment, the status (e.g., operational status such as power consumption, on/off status, etc.) of the power outlets 410-412 and the lighting arrangements 413, 415, 417 may be stored in the mobile device 424. For example, when the mobile device 424 controls a plurality of lamp ballasts, operational information of the lamp ballast may be stored in the mobile device 424. If the dimming of lights in a room is required by a building manager, the building manager can use the mobile device 424 and enter an instruction to dim the lights. This instruction may then be communicated via the wireless communications network 116 to a lamp ballast of an associated lighting arrangement (e.g., the lighting arrangements 413, 415, 417). In some example embodiments, the management module 402 may be updated to reflect changes to the lighting arrangements affected by the mobile device 424. In an example embodiment, device data is provided in a table that is accessible to other nodes or devices for review and/or updating.

In an example embodiment, the system 400 may be used to track or monitor assets (e.g., any asset item in a building such as projectors, video monitors, or other high value goods) located within the building. In this example embodiment, a user may traverse through a building with the mobile device 424. When the mobile device 424 is in proximity to an asset configured to communicate with the mobile device 424, the mobile device 424 may collect information from the asset and record associated asset information. In this manner an inventory of assets located within a building may be obtained. The mobile device 424 may exchange asset information with other devices on the communications network, for example, exchange asset information with the management module 402. In an example embodiment the assets may include an electronic device 200 to communicate with the communications network 116.

Figure 5:
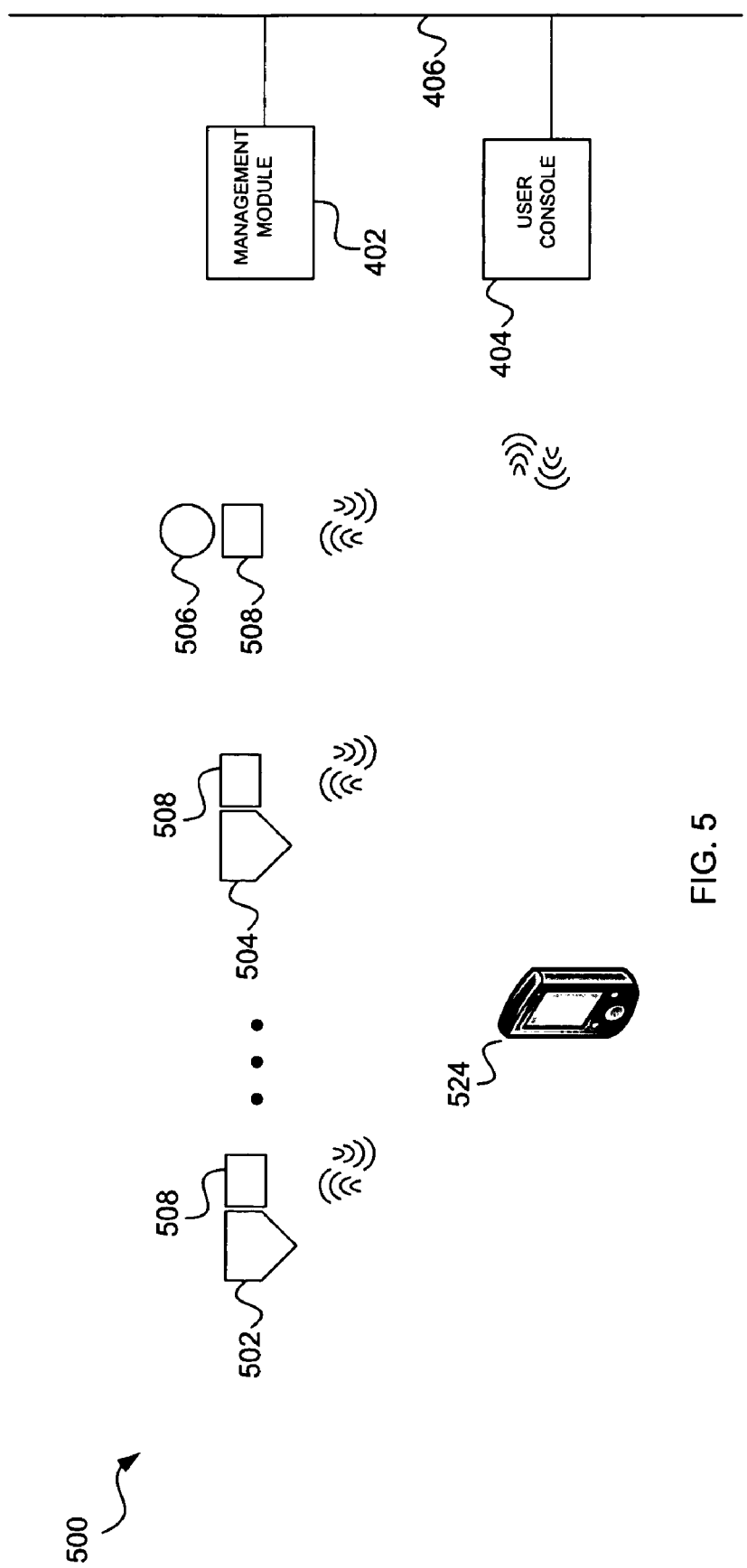
FIG. 5 shows a schematic block diagram of a system, in accordance with an example embodiment, in which multiple devices communicate via only wireless links with a wireless gateway node.

FIG. 5 shows a schematic block diagram of a system 500, in accordance with an example embodiment, in which multiple electronic devices 502-506 communicate via only wireless links with a wireless gateway node provided, for example, at the user console 404. Each device 502-506 includes an associated electrical load or appliance 508 and, optionally, a mobile device 524 (which may be substantially similar to the mobile device 424). In the system 500, the devices 502-506 and the mobile device 524 are interfaced via wireless links directly with the user console 404 and, thus, to the IP backbone 406. In an example embodiment, the system 500 could be installed in a first building, and monitoring and control of the devices 502-506 may be performed remotely in a second building via the IP backbone 406. In these example circumstances, the IP backbone 406 may include the Internet, a peer-to-peer network, a virtual private network (VPN), a secure socket layer (SSL) connection, or the like.

Figure 6:
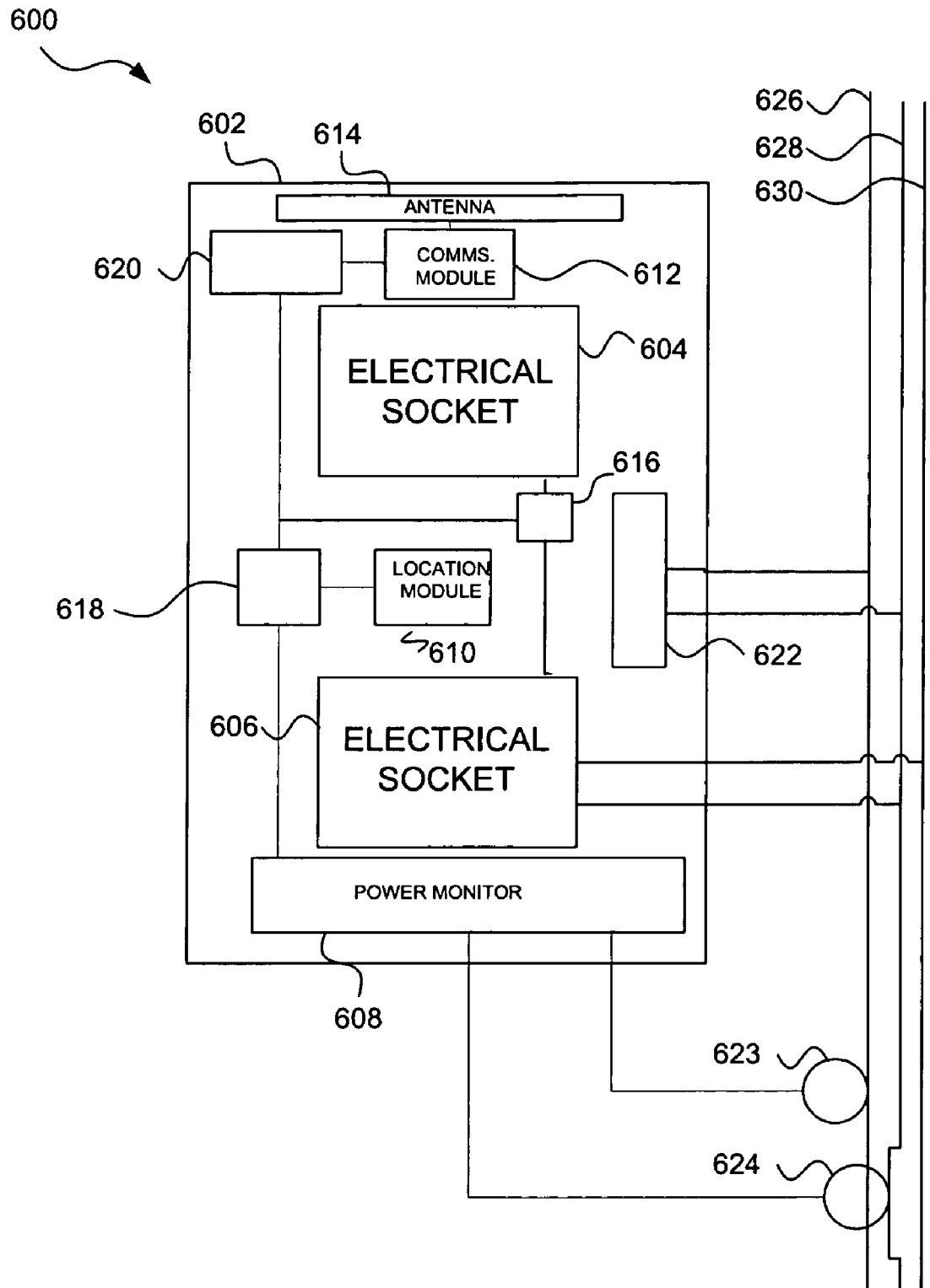
FIG. 6 shows an electrical device in the form of a power outlet, in accordance with an example embodiment, configured to communicate a location and monitored power consumption data wirelessly to a system controller.

FIG. 6 shows an electrical device in the form of a power outlet 600, in accordance with an example embodiment, configured to communicate a location and monitored power consumption data wirelessly to a system controller. The power outlet 600 includes include a mounting arrangement 602 (e.g., a mounting plate) to securely mount the power outlet in a building wall, a server rack, or any other suitable location. The power outlet 600 further includes electrical sockets 604, 606 each for receiving an electrical plug of an electrical appliance. For example, the sockets 604, 606 may be suitable for receiving power plugs provided at ends of power cables of electronic appliances such as personal computers or the like.

The power outlet 600 further includes a power monitor 608 to monitor power usage by one or more appliance devices connected to the power outlet 600 via the electrical sockets 604, 606. A location module 610 is provided to provide the location of the power outlet 600 with a building. The power monitor 608 and the location module may substantially resemble the power monitor 210 and the location module 206 of electronic device 200 shown in FIG. 2. Current sensors 623 and 624 may monitor current drawn by electrical appliances plugged into the electrical sockets 604, 606.

Further, a communications module 612, with an associated antenna 614, is provided to communicate device data to other devices on the communications network. In an example embodiment, device data may be communicated via power lines 626 and 628 to one or more other electronic devices. The antenna 614 may be a dipole antenna (e.g., a 5-centimeter dipole antenna).

In an example embodiment, the power outlet 600 and the location module 610 may include a physical location circuit to determine a physical location of the power outlet 600 with respect to a building within which it is mounted. For example, a Global Positioning System (GPS) chip may be included in the location module. In some embodiments, location monitor 610 is configured to measure the signal strength of another device to estimate its location within the building (e.g., estimate how far that device is from another electronic device with a known location). The signal strength information may thus be used to perform a calculation of the physical location of the electronic device. In another example embodiment, the location monitor 610 may be programmed with its physical location data in the building. For example, a second electronic device that is not programmed with its physical location may then derive its location from another electronic device having programmed location data.

In an example embodiment, the power outlet 600 may be programmed with its location data using the mobile device 424. For example, the mobile device 424 may include circuitry (e.g., a GPS circuit) to identify its position with a building and, when in proximity to the power outlet 600, may communicate this location data to the power outlet 600. In a similar manner, a location of a lighting arrangement (e.g., the lighting arrangements 413, 415, 417 may be programmed).

The power outlet 600 is further shown to include a power control module to control power provided by the electrical sockets 604, 606. In an example embodiment the power control module 616 includes a relay to switch power on and off. Accordingly, power provided by the power outlet 600 may be remotely switched on and off via the communications network. A device controller 618 is provided to control operation of the various modules of the power outlet 600.

Further, in some example embodiments, a wireless router module 620 is provided to route communications. A power line communication module may be provided to communicate via the power lines 626, 628, and 630 and, in these circumstances, the wireless router module 620 may route communications received wirelessly to an IP backbone (e.g., the IP backbone 406 via a power reticulation network.

Circuitry to implement the example modules in the power outlet 600 may be provided on a printed circuit board (PCB) that is attached to the mounting arrangement 602. A transformer 622 may provide power to the example modules of the power outlet 600.

In an example embodiment, the power monitor 608 communicates power usage data obtained from the current sensors 623, 624 to the device controller 618. This data may be communicated to an appliance plugged into the power outlet 600 via a power cord of the appliance.

Various different housing may be provided dependent upon the specific deployment of the power outlet 600 within the building. Likewise, the various components may be arranged in different positions to fit within standard power outlet housings. For example, components of certain example embodiments are arranged and sized for compatibility with the National Electrical Manufacturers Association 5-15 outlet standard.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A networked electrical device configured to be coupled between a power distribution network of a building and an electrical appliance, the networked electrical device comprising:
   a mounting arrangement configured to mount the networked electrical device operatively within a building;
   a connection arrangement to operatively connect the networked electrical device to a power distribution network of the building, power from the power distribution network to power the electrical device;
   a device communication module to communicate with at least one other networked electrical device configured to be coupled between a power distribution network of a building and an electrical appliance, the at least one other networked electrical device located within the building;
   a location module configured to provide a location of the at least one other networked electrical device within the building, the location being based on information about a received wireless signal associated with a communication between the networked electrical device and the at least one other networked electrical device; and
   a switch configured to remotely switch power on or off from the power distribution network to the networked electrical device.

2. The device of claim 1, wherein the location is based on a received signal strength of the communication between the networked electrical device and the at least one other networked electrical device.

3. The device of claim 1, wherein the location is determined from communications between a plurality of networked electrical devices and the at least one other networked electrical device using triangulation.

4. The device of claim 1, further comprising a power monitor configured to monitor power consumption of an electrical appliance connectable to the networked electrical device.

5. The device of claim 1, wherein the networked electrical device is connectable via the power distribution network to a system controller, the system controller being operable to communicate with a plurality of the networked electrical devices to control operation of the networked electrical devices.

6. The device of claim 1, wherein the networked electrical device is incorporated into a power outlet.

7. The device of claim 1, wherein the networked electrical device is incorporated into a lighting arrangement.

8. The device of claim 1, wherein the networked electrical device is incorporated into a heating, ventilation, air conditioning (HVAC) device.

9. The device of claim 1, wherein the location module is configured to store physical coordinate data that identifies a physical location of the networked electrical device within the building.

10. The device of claim 1, wherein the device communication module is a low-power, short range transceiver.

11. The device of claim 1, further comprising an appliance controller configured to control an electrical appliance connectable to the networked electrical device.

12. The device of claim 1, wherein the communication module is configured to receive location data from the at least one other networked electrical device and identify the location of the networked electrical device based on the location data.

13. The device of claim 1, wherein the power distribution network interfaces with an Ethernet.

14. A system comprising:
   a plurality of networked electrical devices configured to be coupled between a power distribution network of a building and an electrical appliance, each networked electrical device comprising:
      a mounting arrangement configured to mount the networked electrical device within a building;
      a connection arrangement to operatively connect the networked electrical device to a power distribution network, power from the power distribution network to power the electrical device;
      a device communication module to communicate with at least one other networked electrical device configured to be coupled between a power distribution network of a building and an electrical appliance, the networked electrical device located within the building;
      a location module configured to provide a location of the at least one other networked electrical device within the building, the location being based on information about a received wireless signal associated with a communication between the networked electrical device and the at least one other networked electrical device; and
      a switch configured to remotely switch power on or off from the power distribution network to the networked electrical device; and
   a system controller comprising:
      a system communication module to communicate with the plurality of networked electrical devices; and
      a control module configured to receive the location from each of the networked electrical devices and, based on the location information, identify a physical location of the at least one other networked electrical device within the building.

15. The system of claim 14, further comprising:
   a power monitor provided within the networked electrical device and configured to monitor power consumption of an electrical appliance connectable to the networked electrical device; and
   a user console, the user console including a display to display the power consumption and the location of the networked electrical appliance.

16. The system of claim 15, further comprising:
   a user input module to receive user input from a user; and
   a processing module to process the user input and generate control signals to communicate to one or more of the networked electrical devices to control operation of the plurality of networked electrical devices.

17. A method comprising:
communicating between a networked electrical device and at least one other networked electrical device, both configured to be coupled between a power distribution network of a building and an electrical appliance, and both located within a building, at least one of the networked electrical devices being fixedly mounted within the building;
identifying a location of the at least one other networked electrical device within a building based on information about a received wireless signal associated with a communication between the networked electrical device and the at least one other networked electrical device;
communicating the location from the networked electrical device to a system controller;
receiving a remote signal to switch power on or off from the power distribution network to the networked electrical device; and
switching the power on or off based on the remote signal.

18. A networked electrical device configured to be coupled between a power distribution network of a building and an electrical appliance, the networked electrical device comprising:
means for mounting the networked electrical device within a building;
means for monitoring a location of at least one other networked electrical device within the building based on information about a received wireless signal associated with a communication between the networked electrical device and the at least one other networked electrical device, the at least one other network device configured to be coupled between a power distribution network of a building and an electrical appliance;
means for monitoring power consumption of an electrical appliance connectable to the networked electrical device;
means for communicating the location and the power consumption; and
means for remotely switching the power on or off from the power distribution network to the networked electrical device.

19. The device of claim 1, wherein the switch receives remote signals to switch the power on or off from the power distribution network to the networked electrical device.

20. The device of claim 1, further comprising a network communication module configured to interface the networked electrical device to the power distribution network to communicate the location via the power distribution network.

21. The system of claim 14 wherein the networked electrical devices further comprise a network communication module configured to interface the networked electrical device to the power distribution network to communicate the location via the power distribution network.

22. The method of claim 17, wherein the communication of the location from the networked electrical device to a system controller is done using the power distribution network.

23. The device of claim 18, further comprising a means for interfacing the networked electrical device to a power distribution network, the means for interfacing used to communicate the location and the power consumption.

* * * * *